US008839144B2

(12) United States Patent
Kraus et al.

(10) Patent No.: US 8,839,144 B2
(45) Date of Patent: Sep. 16, 2014

(54) ADD AND COMBINE REPORTS

(75) Inventors: Stefan Kraus, Bruchsal (DE); Tahar El Idrissi-Lamghari, Walldorf (DE); Peter Tillert, Bad Schoenborn (DE); Christian Baeck, Wiesloch (DE); Gerrit Simon Kazmaier, Metzingen (DE)

(73) Assignee: SAP AG, Walldorf (DE)

( * ) Notice: Subject to any disclaimer, the term of this patent is extended or adjusted under 35 U.S.C. 154(b) by 552 days.

(21) Appl. No.: 12/980,585

(22) Filed: Dec. 29, 2010

(65) Prior Publication Data
US 2012/0174013 A1 Jul. 5, 2012

(51) Int. Cl.
*G06F 3/0481* (2013.01)
*G06Q 10/06* (2012.01)

(52) U.S. Cl.
CPC ........... *G06Q 10/063* (2013.01); *G06F 3/0481* (2013.01); *G06Q 10/0631* (2013.01)
USPC ......................................... 715/804; 715/834

(58) Field of Classification Search
CPC ............................... G06F 3/048; G06F 3/0481
USPC ......... 715/771–773, 765, 769, 802, 804, 805, 715/834, 821–823; 705/4
See application file for complete search history.

(56) References Cited

U.S. PATENT DOCUMENTS

| | | | | | |
|---|---|---|---|---|---|
| 5,870,089 | A | * | 2/1999 | Fabbio et al. | 715/733 |
| 5,920,848 | A | * | 7/1999 | Schutzer et al. | 705/42 |
| 6,990,654 | B2 | * | 1/2006 | Carroll, Jr. | 717/109 |
| 7,113,933 | B1 | * | 9/2006 | Imholte | 705/7.15 |
| 7,302,444 | B1 | * | 11/2007 | Dunmore et al. | 1/1 |
| 7,363,309 | B1 | * | 4/2008 | Waite et al. | 1/1 |
| 7,529,784 | B2 | * | 5/2009 | Kavuri et al. | 1/1 |
| 7,548,839 | B2 | * | 6/2009 | Dodds | 703/3 |
| 8,204,692 | B2 | * | 6/2012 | Arango et al. | 702/9 |

(Continued)

*Primary Examiner* — Steven Sax
(74) *Attorney, Agent, or Firm* — Buckley, Maschoff & Talwalkar LLC

(57) ABSTRACT

A system may include reception of a selection of a first report, the first report based on a first data source defining a first plurality of fields and defining a first at least one key figure, the first report including at least one of the first at least one key figures and at least one of the first plurality of fields, presentation of a first graphical representation of the first data source, the first graphical representation comprising a first graphical icon representing the first at least one key figure, and at least one second graphical icon, each of the at least one second graphical icons representing a respective one of the at least one of the first plurality of fields of the first report, reception of a selection of a second report, the second report based on a second data source defining a second plurality of fields and defining a second at least one key figure, the second report including at least one of the second at least one key figures and at least one of the second plurality of fields, presentation of a second graphical representation of the second data source, the second graphical representation graphically linked to the first graphical representation and comprising a third graphical icon representing the second at least one key figure and a plurality of fourth graphical icons, each of the plurality of fourth graphical icons representing a respective one of the second plurality of fields, reception of a selection of one of the plurality of fourth graphical icons representing one of the second plurality of fields, and generation of a third report comprising the at least one of the first plurality of fields and the one of the second plurality of fields.

21 Claims, 16 Drawing Sheets

(56) References Cited

U.S. PATENT DOCUMENTS

| | | |
|---|---|---|
| 2004/0049345 A1* | 3/2004 | McDonough et al. .......... 702/12 |
| 2004/0135821 A1* | 7/2004 | Mazzeo ........................ 345/848 |
| 2005/0119767 A1* | 6/2005 | Kiwimagi et al. .............. 700/19 |
| 2006/0004612 A1* | 1/2006 | Chewning et al. ................ 705/4 |
| 2006/0101066 A1* | 5/2006 | Harris ........................... 707/102 |
| 2007/0038610 A1* | 2/2007 | Omoigui ........................... 707/3 |
| 2007/0136321 A1* | 6/2007 | Allen et al. ................... 707/100 |
| 2007/0143149 A1* | 6/2007 | Buttner et al. .................... 705/3 |
| 2007/0274154 A1* | 11/2007 | Simon et al. .................... 367/38 |
| 2007/0277111 A1* | 11/2007 | Bennett et al. ................ 715/763 |
| 2008/0048890 A1* | 2/2008 | Sheha et al. ............... 340/995.1 |
| 2008/0059437 A1* | 3/2008 | Nagappan ........................ 707/3 |
| 2008/0086316 A1* | 4/2008 | Frank et al. ....................... 705/1 |
| 2009/0158139 A1* | 6/2009 | Morris et al. ................. 715/234 |
| 2009/0319544 A1* | 12/2009 | Griffin et al. ................. 707/100 |
| 2010/0114493 A1* | 5/2010 | Vestal .............................. 702/9 |
| 2010/0274479 A1* | 10/2010 | Sheha et al. .................. 701/202 |
| 2011/0145036 A1* | 6/2011 | Herschmann et al. ....... 705/7.23 |
| 2011/0288962 A1* | 11/2011 | Rankin et al. ................ 705/27.1 |

* cited by examiner

FIG. 2

ADD AND COMBINE REPORTS

FIELD

Some embodiments relate to the flexible consumption of analytical reports provided by a business process platform. More specifically, some embodiments relate to systems to adapt and/or combine analytical reports.

BACKGROUND

Conventional business computing systems allow users to selectively view predefined reports. A report draws data from a distinct data source, such as a database table or other data structure defined by metadata. Some systems allow a user to add fields or key figures from the data source to the report, or to remove data source fields/key figures therefrom. Systems may also allow users to customize the layout of a report or to select particular data of the fields for populating the report.

A typical user is unable to easily incorporate fields or key fields from a second data source into a report which is associated with a first data source. This limitation prevents users from discovering answers to business questions which may arise, particularly in cases where the business questions cross business areas (e.g., Payments and Delivery).

Systems are desired to facilitate the combination of reports associated with different data sources.

BRIEF DESCRIPTION OF THE DRAWINGS

FIG. 2 is an outward view of a spreadsheet application user interface according to some embodiments.

DETAILED DESCRIPTION

Figure 1:
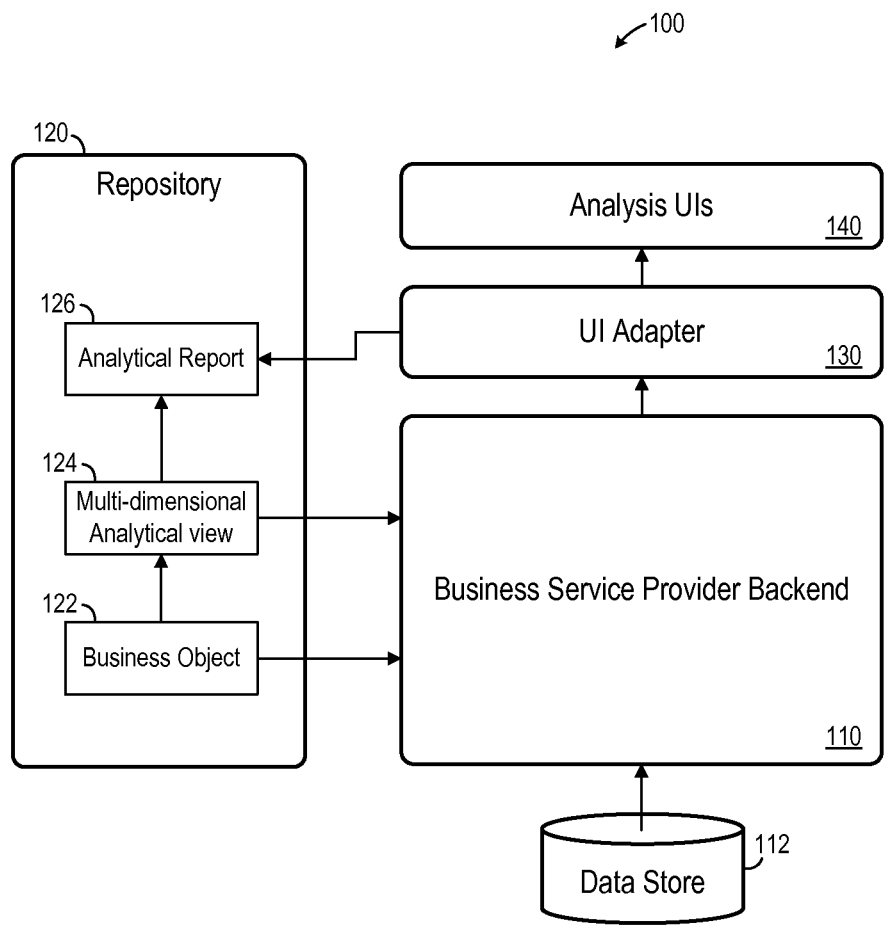
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

System 100 includes business service provider backend 110 for providing business services to consumers (not shown) of system 100. For example, business service provider backend 110 might store customer information into and retrieve customer information from physical tables of data store 112.

The data stored in data store 112 may be received from disparate hardware and software systems, some of which are not interoperational with one another. The systems may comprise a back-end data environment employed in a business or industrial context. The data may be pushed to data store 112 and/or provided in response to queries received therefrom.

The data of data store 112 may reside in a physical database or stored in-memory (e.g., in Random Access Memory). The data comprise a relational database, an in-memory database, a multi-dimensional database, an eXtendable Markup Language (XML) document, and/or any other structured data storage system. The physical tables of data store 112 may be distributed among several relational databases, dimensional databases, and/or other data sources. To provide economies of scale, data store 112 may include data of more than one customer. Business service provider backend 110 includes mechanisms to ensure that a client accesses only the data that the client is authorized to access. Moreover, the data of data store 112 may be indexed and/or selectively replicated in an index to allow fast retrieval thereof.

The structures of and relationships between the physical database tables may be complex, and business object object models (referred to henceforth as "business objects") may be used to shield developers and end-users from these complexities. System 100 implements metadata models to support different business solutions. Metadata models may include generic models of a business object, a floorplan (i.e., a user interface layout), user interface text, a process component, and a message type, among others. A business object, for example, is a software model representing real-world items used during the transaction of business. An instance of a business object metadata model may comprise a SalesOrder object model or an Organization object model. Instances of these object models, in turn, represent specific data (e.g., SalesOrder 4711, ACME corporation) and provide a mapping to the underlying tables storing the specific data associated with a particular sales order.

Repository 120 includes metadata of various metadata models. These metadata models include metaobjects and instances of the metaobjects, referred to herein as object models or objects. The metaobjects and object models are defined by metadata of repository 120.

As mentioned above, the metaobjects may include generic models of a BI view, a floorplan, a business object, a user interface text, a process component, and a message type, but embodiments are not limited thereto. The metaobjects and object models may be embodied in any type of data structure, including but not limited to eXtensible Markup Language files. As in the conventional storage of object instance data, the metadata defining the specific metaobjects and object models may be stored in database tables and/or any other suitable format.

Each metaobject of repository 120 may comprise an instance of a same meta-metadata model (or meta-metaobject). The meta-metaobject may consist of nodes, composite associations, associations, elements structure and attribute properties. Development of specific business object metaobjects, specific floorplan metaobjects, etc. may therefore proceed using the same development technologies. Moreover, access and lifecycle issues of the various specific metaobjects may be managed using similar (or identical) mechanisms.

Business object 122 is an object model, or class. The metadata of business object 122 therefore provides information regarding the structure and attributes of the data of instances of business object 122. Accordingly, backend 110 uses the metadata to access corresponding data of data store 112.

Repository 120 also includes metadata of one or more multi-dimensional analytical view object models (MDAVs), which themselves are instances of an MDAV metadata model such as described in commonly-assigned, co-pending U.S. application Ser. No. 12/847,409, entitled "Common Modeling Of Data Access And Provisioning For Search, Query, Reporting And/Or Analytics", the contents of which are incorporated herein by reference. Generally, a multi-dimensional analytical view describes a view on a business object. As described in U.S. application Ser. No. 12/847,409, a query definition object (not shown) may define a query on a business object, and a multi-dimensional analytical view may define the results of the query as Key Figures or Characteristics. Moreover, the multi-dimensional analytical view may define rules which are used to calculate Key Figures and to define restrictions which will be used at runtime to set pre-defined filter parameters.

Analytical report 126 includes metadata describing a presentation of data which is, in turn, defined by underlying MDAV 124 and business object 122. The ability to associate analytical report 126 with MDAV 124 may facilitate the incorporation of semantically-rich information within analytical report 126. For example, analytical report 126 may simply refer to Key Figures which are calculated according to MDAV 124, without having to define a query for particular data of business object 122 or a calculation of the Key Figures based on that data.

According to some embodiments, an MDAV may be associated with more than one business object and a business object may be associated with more than one MDAV. In some embodiments, an MDAV may be associated with more than one analytical report.

Analytical report 126 may be invoked along with a view and variables. The view may provide layout information (e.g., axis labels, chart type, etc.), while the variables further define (e.g., via filters) the data to be presented. A user may select from more than one view and variables according to some embodiments.

User interface (UI) adapter 130 provides reports to one or more analysis UIs 140. Analysis UIs 140 may provide browser-based reports, spreadsheet-based reports, formatted reports, and/or reports in other formats. A client system (not shown) may access one or more of analysis UIs via Web Services according to some embodiments.

Figure 2:
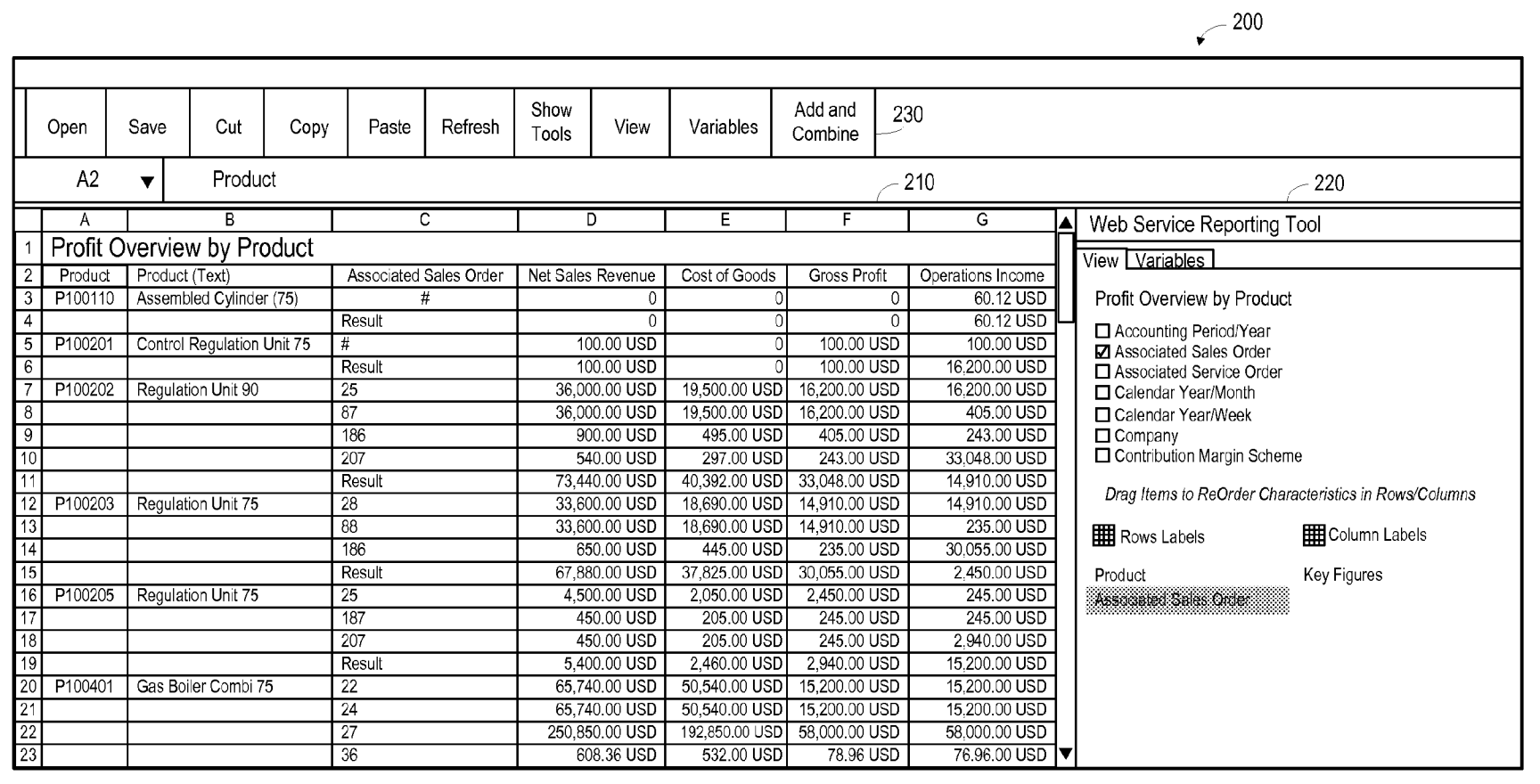

FIG. 2 is an outward view of a user interface according to some embodiments. User interface 200 may be presented on a display of a client device in response to execution of a spreadsheet application by a processor of the client device. Alternatively, user interface 200 may be a Web page displayed by a Web browser application executed by the processor. Embodiments are not limited to these examples.

User interface 200 includes pane 210 displaying a report in a spreadsheet format. Pane 220 allows a user to change the view and/or variables used to generate the displayed report. As mentioned above, the functionality exhibited by user interface 200 may be provided in part by Web Service requests to a Web Service provider such as system 100.

Figure 3:
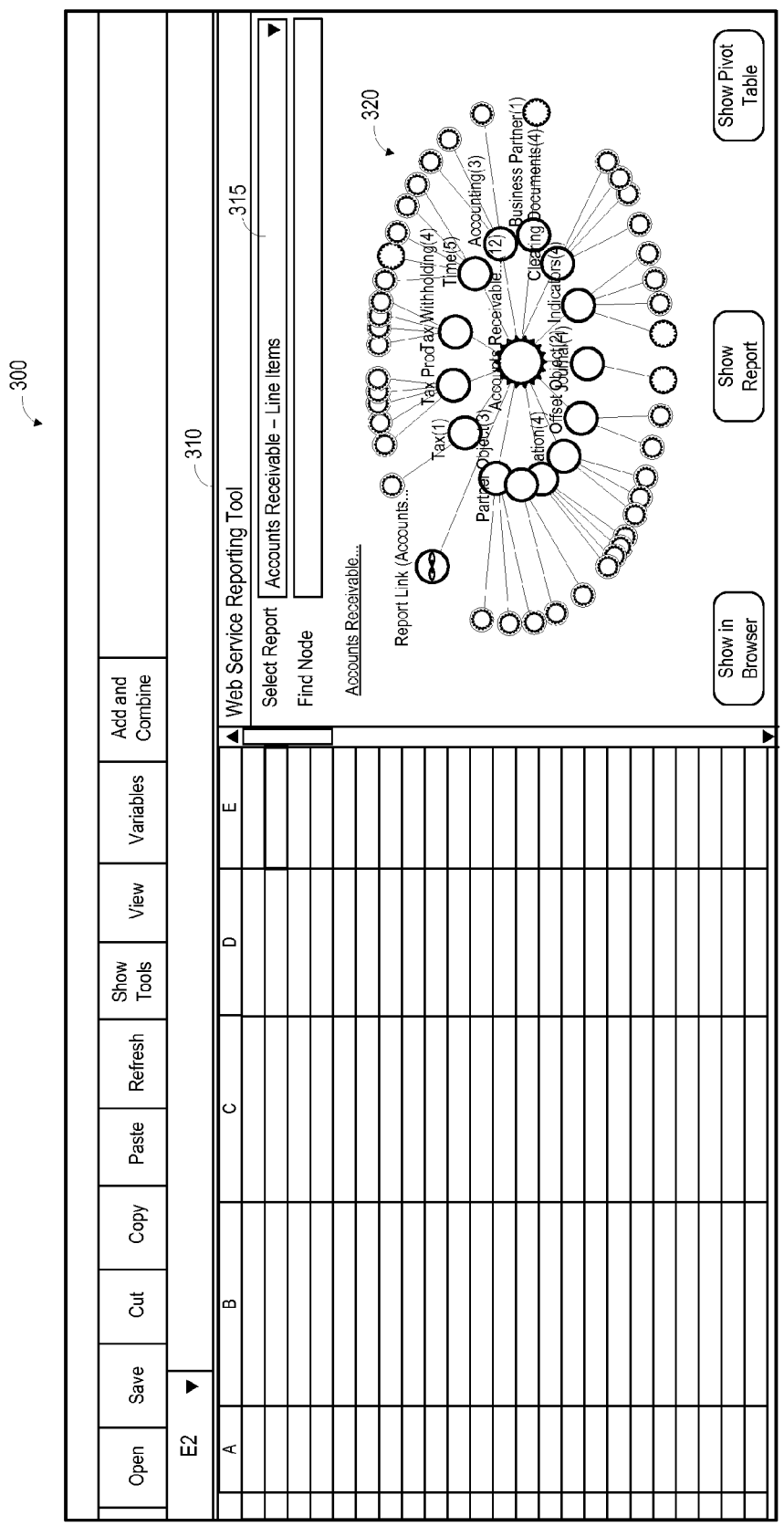
FIG. 3 is an outward view of a spreadsheet application user interface according to some embodiments.

It will be assumed that a user wishes to modify the fields and key figures. As will be evident from the description below, the fields and key figures are exposed in pane 220 to facilitate adaptation of the desired report view. For example, the user may realize that additional information is required to answer the business question at hand. Accordingly, the user selects "Add and Combine" icon 230. In response, and according to some embodiments, user interface 300 of FIG. 3 is displayed.

For example, the user has used drop-down field 315 of pane 310 to begin his analysis with a report entitled Accounts Receivable—Line Item. The underlying data fields and key figures are then visualized to indicate which fields are already included in the report and which fields are not yet exploited. More particularly, user interface 300 presents diagram 320, which is a graphical representation of the data source upon which the selected report is based. In order to describe diagram 320 in detail, it will be assumed that the user selects Show in Browser icon 325 in order to view a larger version of diagram 320 as represented in FIG. 4.

The present description refers to reception of user input such as selections, and the presentation of information such as user interfaces and graphical representations. Such selection and presentation may be deemed to be performed by a client device operated by a user and/or by a back-end system supporting such functions such as system 100.

Figure 4:
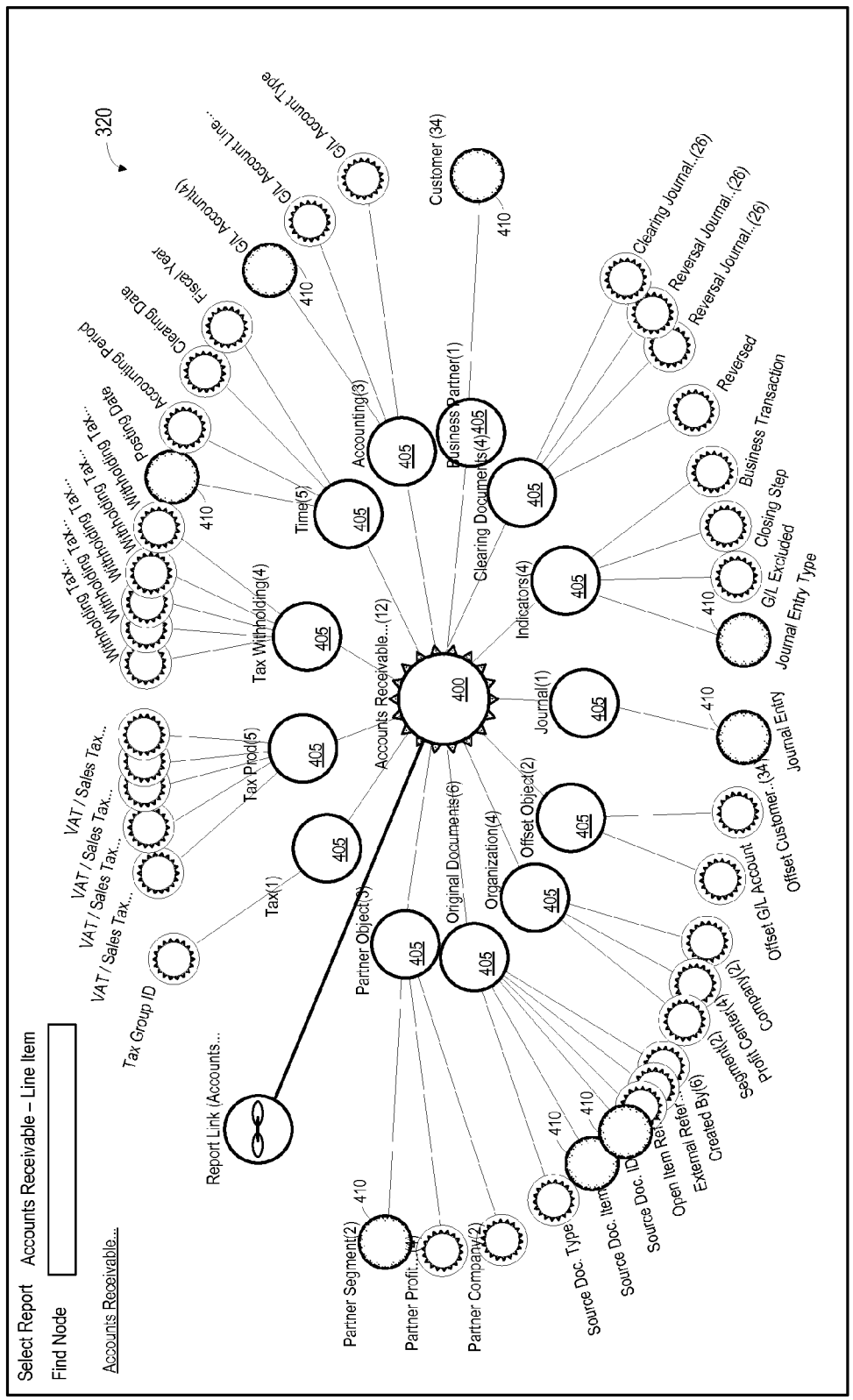
FIG. 4 is a view of a graphical representation of a data source according to some embodiments.

Diagram 320, as shown in FIG. 4, includes graphical icon 400 representing the selected report. As will be described below, graphical icon 400 also represents the key figures of the data source on which the report is based. Graphical icon 400 is graphically connected to thirteen graphical icons 405, each of which represents a dimension of the data source. Generally, a dimension is a collection of fields and/or characteristics within the data source. For purposes of the present description, the term "fields" will be used to describe both fields and characteristics. In the present example, each icon 405 is labeled with the name of the corresponding dimension and the total number of fields belonging to the dimension.

Icons representing each field are graphically connected to the icon 405 of the dimension to which the fields belong. Each of such icons is labeled with a field name as well as a number of distinct values which populate the field in the underlying data source. Most fields of diagram 320 are represented by a particular graphical icon, while the remaining fields are represented by graphical icon 410. Graphical icon 410 indicates that the corresponding field is selected in the currently-selected report. Accordingly, the fields presented in diagram 320 are can be activated and deactivated by the user. Therefore, diagram 320 simultaneously provides an intuitive presentation of a data source and of a report based on the data source.

Embodiments are not limited to the particular representations of diagram 320 or any other diagrams described herein. For example, icons representing the fields of a dimension may be hidden until an icon representing the dimension is selected. The text labels may appear differently and include less or more information. Although the field icons of diagram 320 are graphically connected to icon 400 through their respective dimensions in order to provide clarity and organization, one or more field icons may be directly connected to icon 400 without an intervening dimension according to some embodiments.

Figure 5:
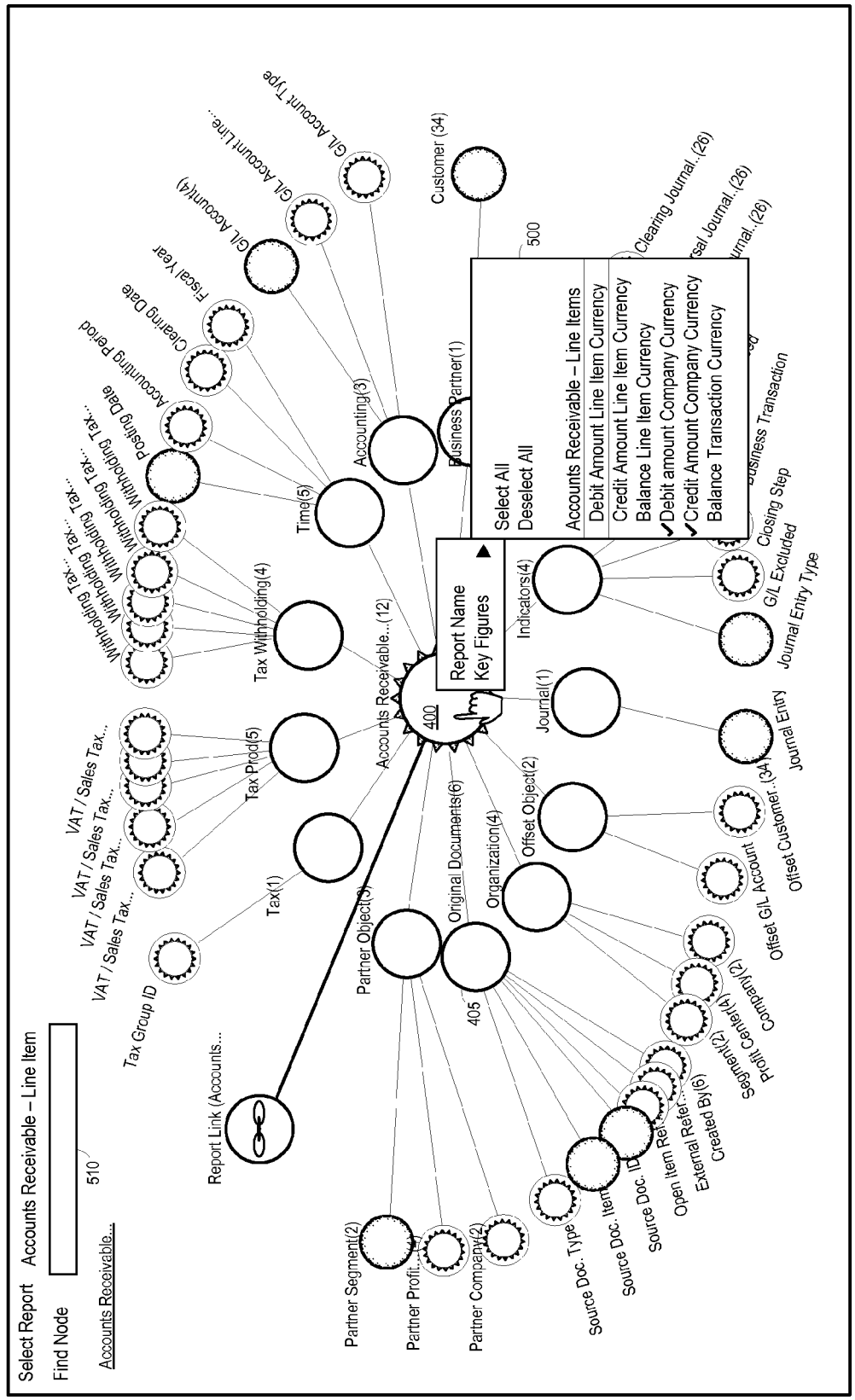
FIG. 5 is a view of a graphical representation of a data source according to some embodiments.

Diagram 320 may be used to modify the selected report. In one example, diagram 320 may be used to change the Key Figures of the report. FIG. 5 illustrates user selection of icon 400, which results in presentation of list 500. List 500 shows the Key Figures of the underlying data source and indicates the Key Figures which are included in the current report. It will be assumed that the user selects Key Figure Debit Amount Line Item Currency from list 500.

Figure 6:
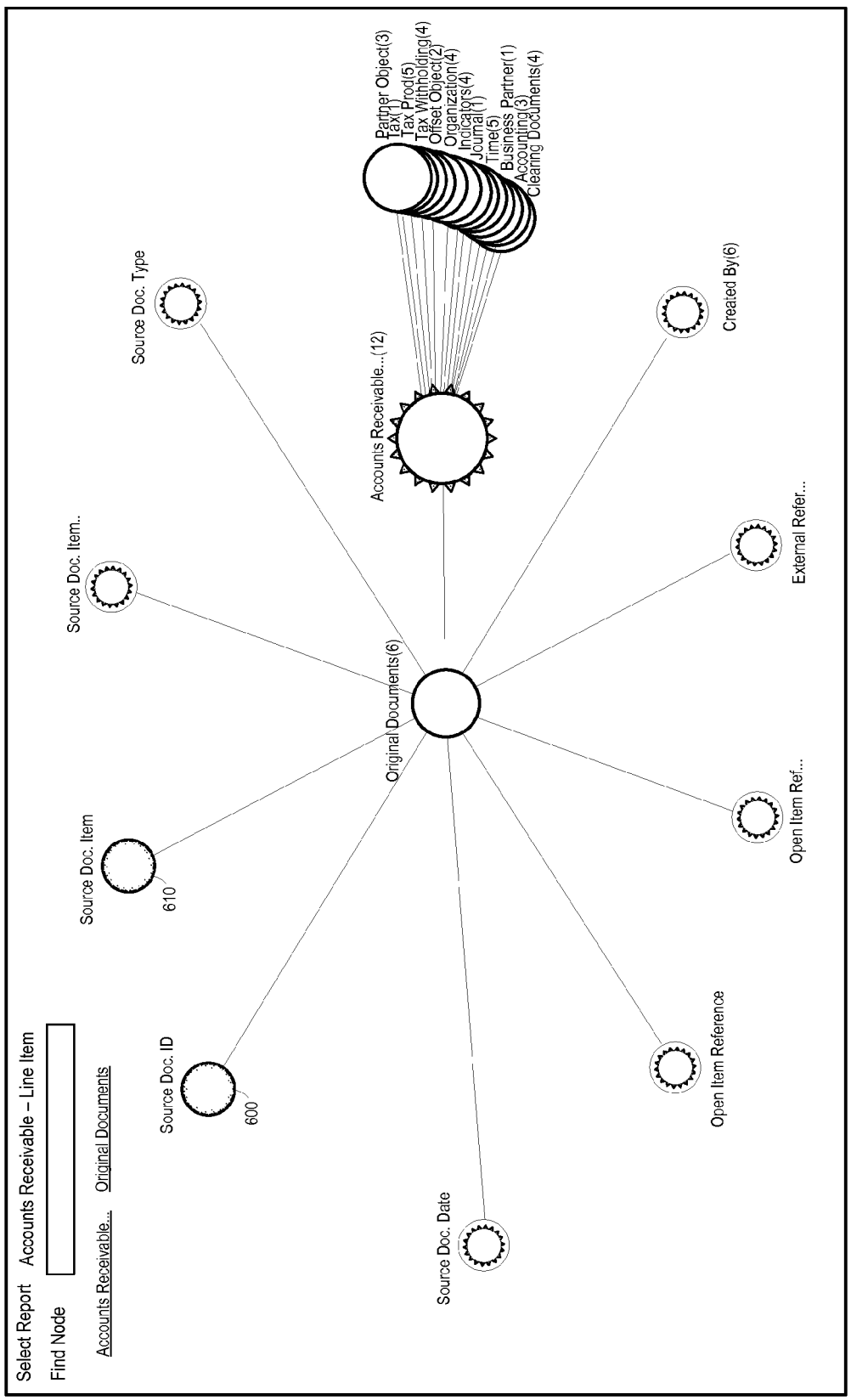
FIG. 6 is a view of a graphical representation of a data source according to some embodiments.

Diagram 320 may also be used to add fields from the data source to the report. In one example, the user selects icon 405 of the Original Documents dimension as displayed in FIG. 5 in order to view the fields of the dimension. Input field 510 may alternatively be used to locate a field or dimension. According to some embodiments, selection of the dimension changes the focus of the diagram to facilitate manipulation of the fields of the selected dimension. FIG. 6 illustrates one example of such a change. As shown, icon 405 of the Original Documents dimension is moved to the center of the diagram, the fields of the remaining dimensions are hidden, and icons 405 of the remaining dimensions are grouped tightly together. The connections between the icons do not change, indicating that the logical relationships therebetween have not changed. Some embodiments may employ animation effects to graphically illustrate the transformation of the diagram of FIG. 5 to the diagram of FIG. 6.

The user has selected icons 600 and 610 associated with fields Source Document ID and Source Document Item. Accordingly, these icons appear as icons 410 of FIG. 4, indicating that their corresponding fields are included in the currently-selected report.

Figure 7:
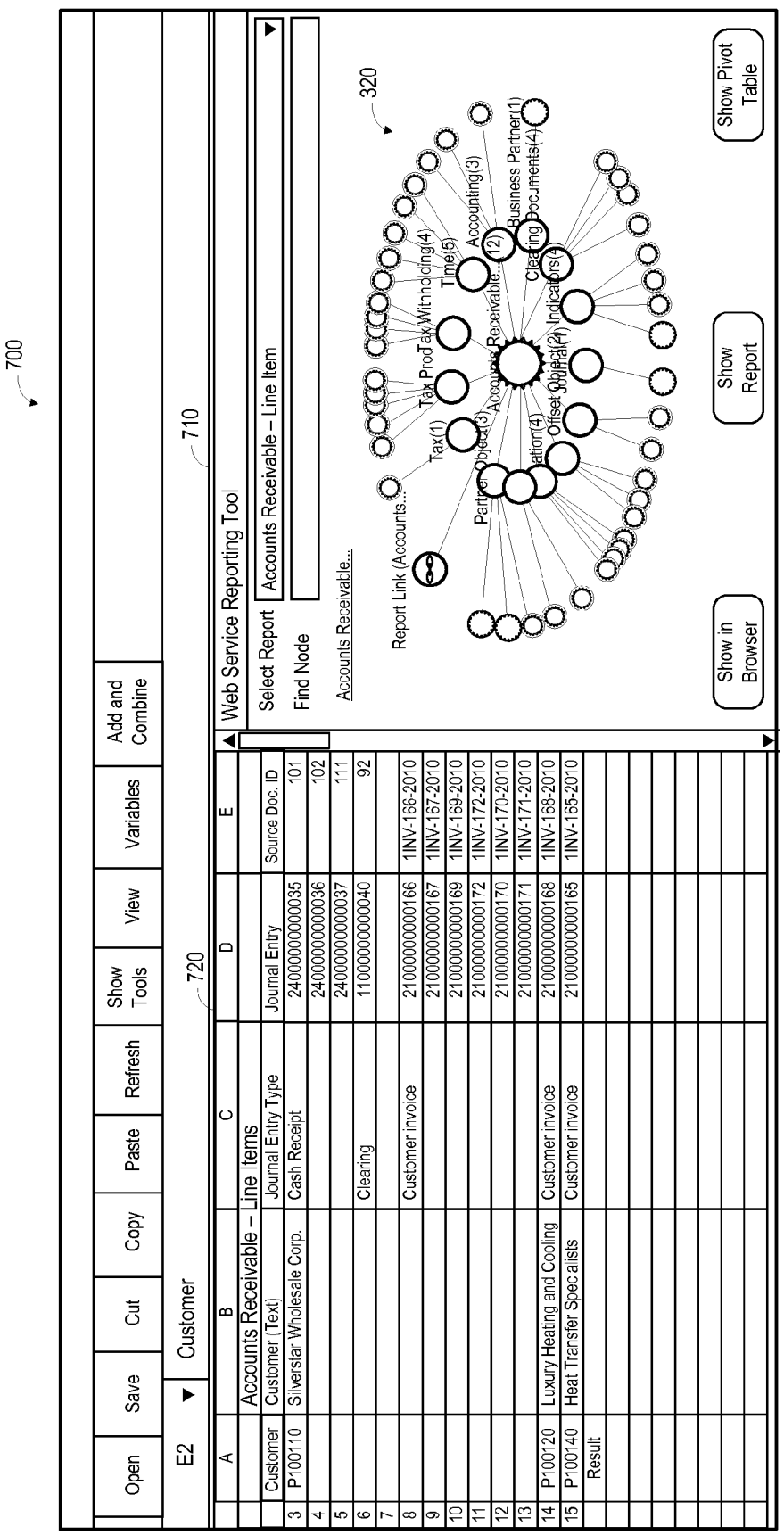
FIG. 7 is an outward view of a spreadsheet application user interface according to some embodiments.

The browser window of FIG. 6 may be closed to display user interface 700 of FIG. 7. Diagram 320 appears in pane 710 and reflects the changes described with respect to FIGS. 5 and 6. Due to space constraints, any technique may be employed to simplify and/or de-clutter diagram 320 as presented in pane 710. In the present example, many of the icon labels have been hidden.

Pane 720 now displays a report reflecting the selections of Key Figures and fields which are represented in diagram 320. Any known techniques for manipulating reports may be applied to the displayed report. For example, the view and variables of the report may be modified via controls such as pane 230 of FIG. 2.

Figure 8:
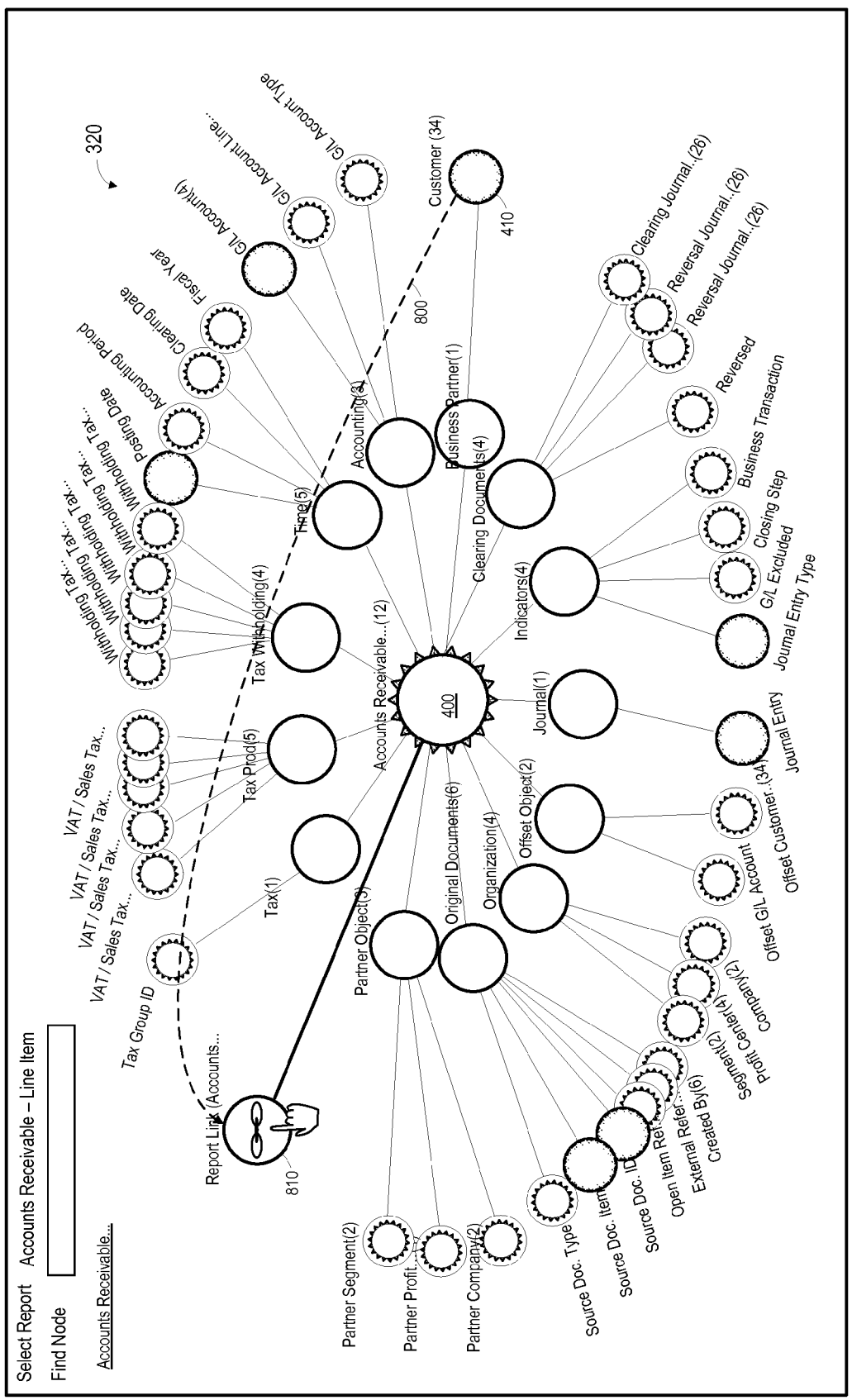
FIG. 8 is a view of a graphical representation of a data source according to some embodiments.

Advantageously, embodiments may also facilitate the combination of fields and/or Key Figures from different data sources into a single report. FIG. 8 shows diagram 320 as described above. Arrow 800 illustrates selection and dragging of icon 410 to Report Link icon 810. Such an action may comprise an instruction to combine the report associated with icon 400 with fields and/or Key Figures of another report, and to map the fields and/or Key Figures based on the Customer field of the current report. Other techniques for inputting such an instruction may be supported.

Figure 9:
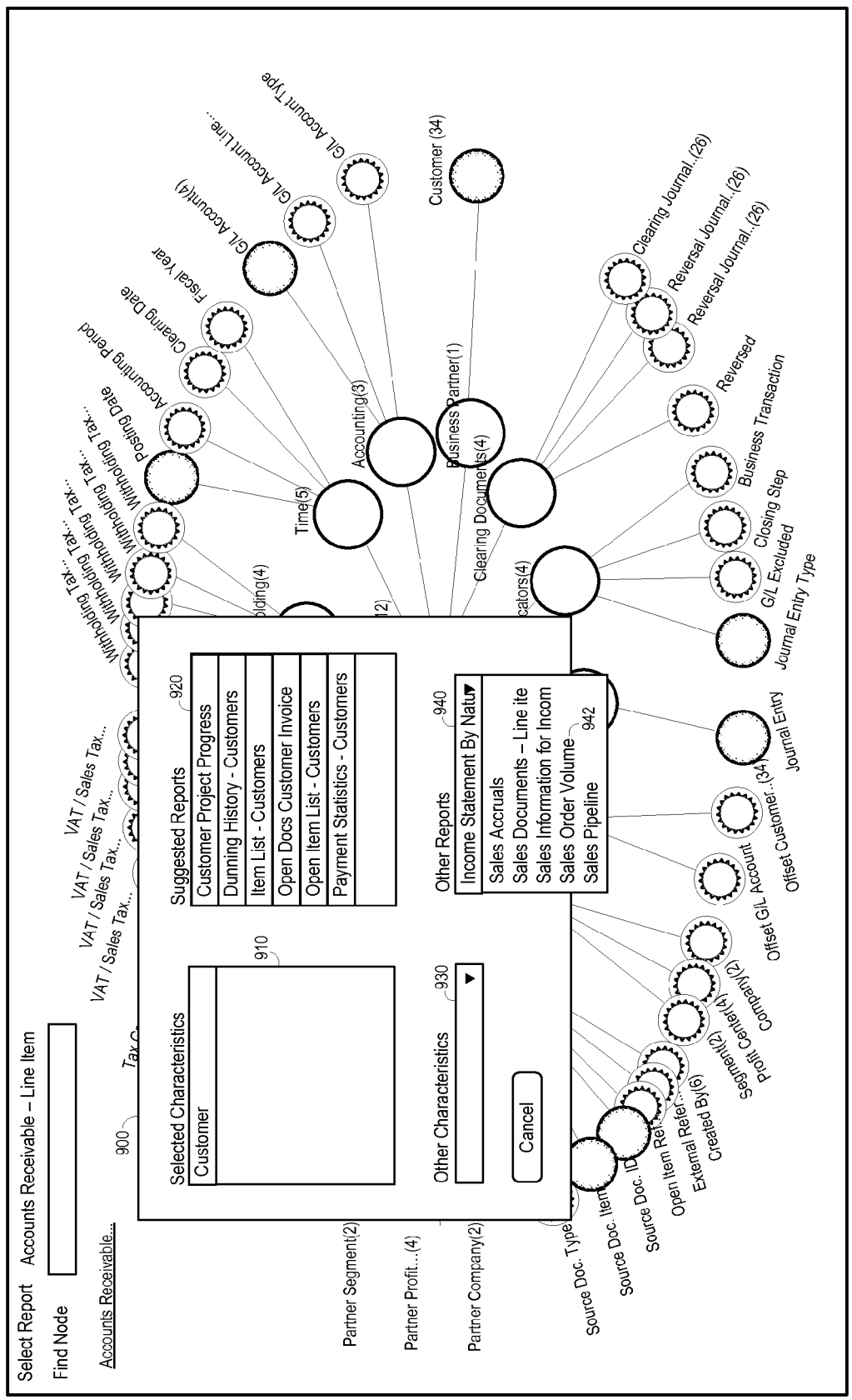
FIG. 9 is a view of a graphical representation of a data source according to some embodiments.

Window 900 of FIG. 9 may be displayed in response to the instruction illustrated in FIG. 8. Input area 910 is pre-populated with the Customer field and, based on this field, selection area 920 suggests reports to combine with the current report. The suggested reports may include the field shown in area 910 or other fields for which a mapping to the field of area 910 is known. Drop-down boxes 930 and 940 allow selection of other fields and reports. It will be assumed that the user selects Sales Order Volume report 942.

Window 900 thereby supports an intuitive mapping of fields, which are used to connect the first report with any further report. As a result, users may easily assign business fields to reports based on a common denominator.

Figure 10:
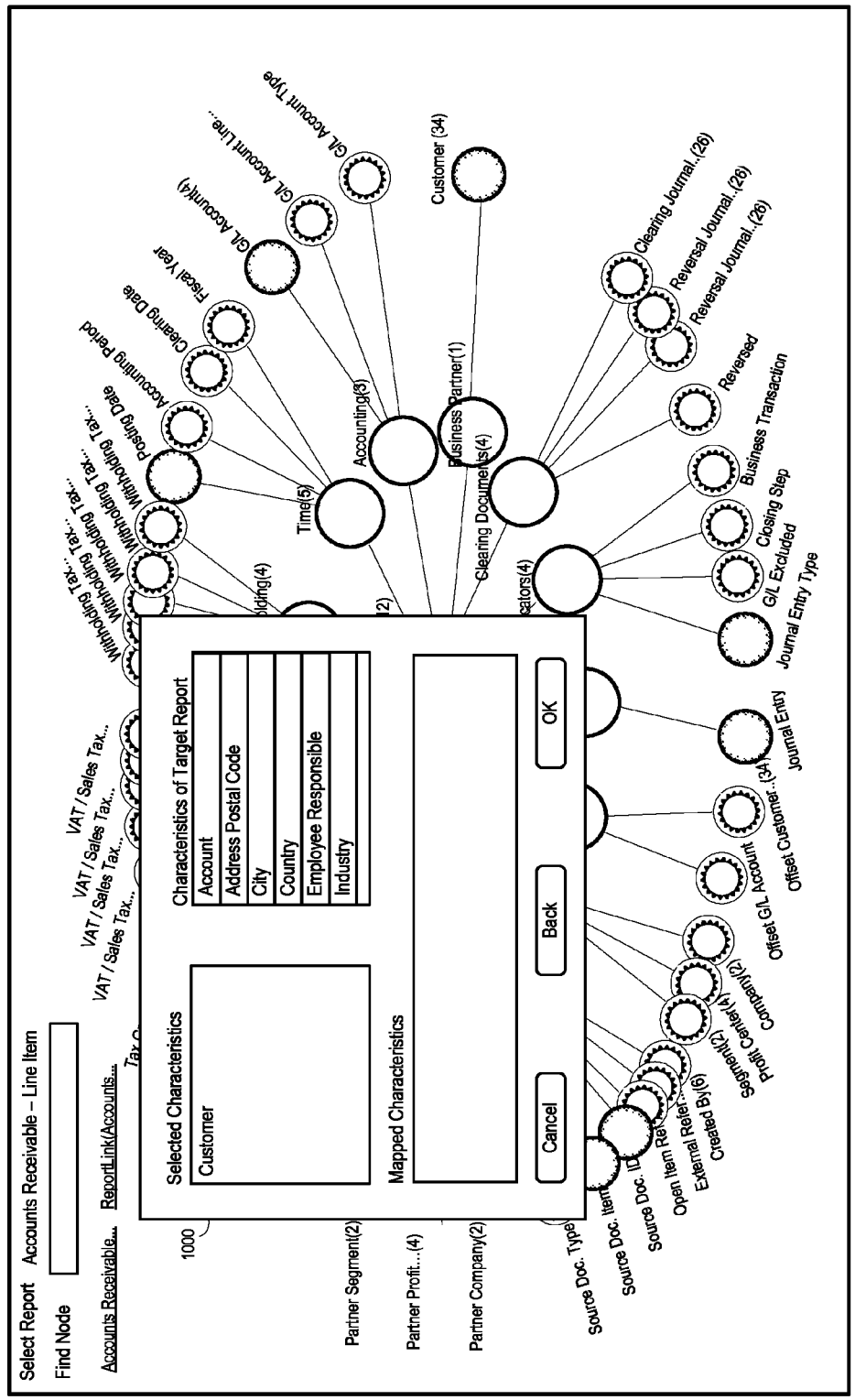
FIG. 10 is a view of a graphical representation of a data source according to some embodiments.

Window 1000 of FIG. 10 is displayed upon selection of a report. Window 1000 allows the user to map one or more fields of the current report to a respective field of the selected (i.e., target) report. For purposes of the present example, it will be assumed that the user manipulates window 1000 to map the Customer field of the current report to the Account field of the target report.

Diagram 320 is then modified to illustrate a combination of the current report and the target report. More particularly, diagram 320 is modified to illustrate a logical relationship between the underlying data sources of the two reports.

Figure 11:
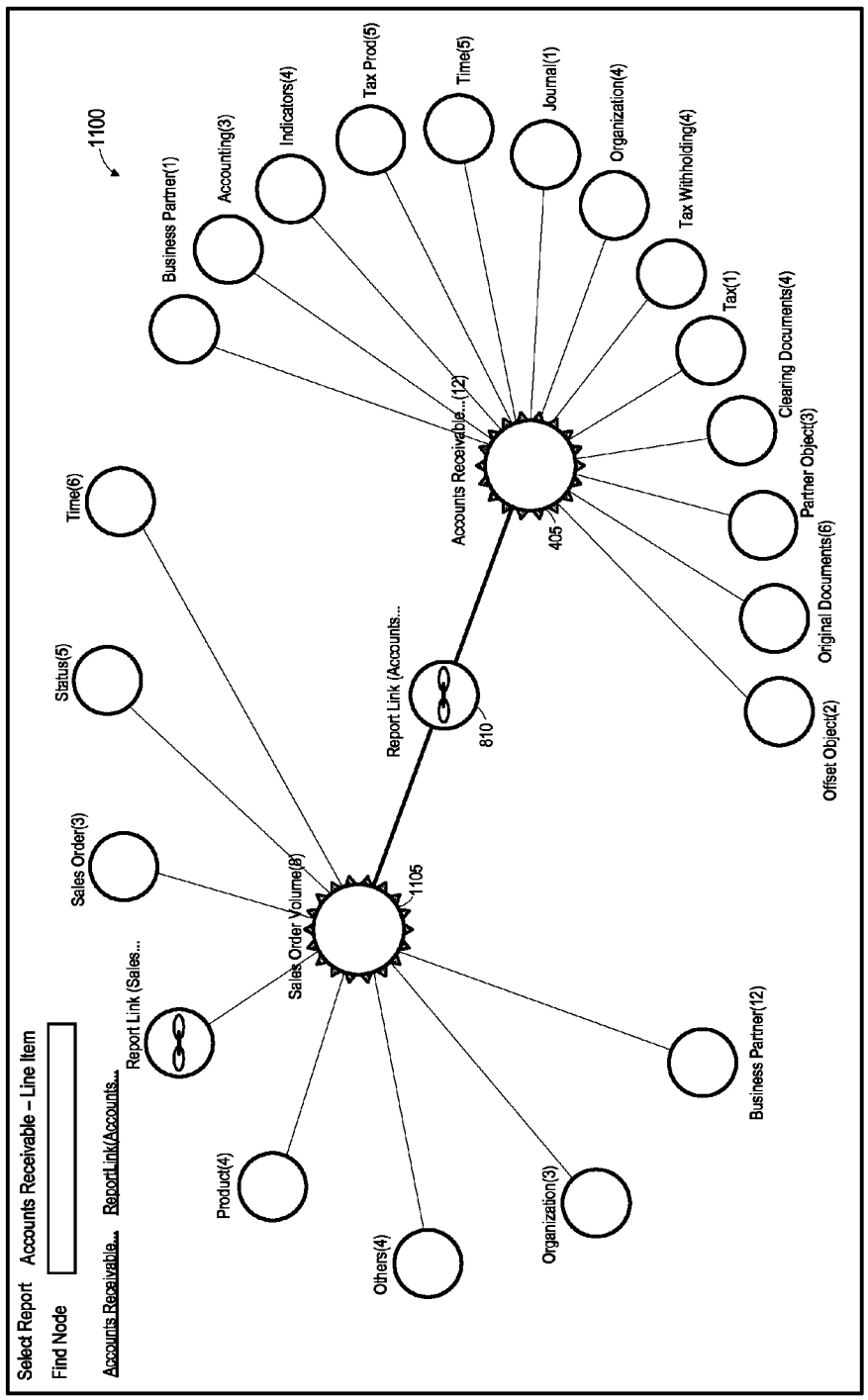
FIG. 11 is a view of graphical representations of two data sources according to some embodiments.

FIG. 11 illustrates diagram 1100 which may be generated and presented according to the present example. Diagram 1100 includes Report Link icon 810, which graphically connects icon 405, representing the Accounts Receivable—Line Item report, to icon 1105, representing the target Sales Order Volume report.

The focus of diagram 1100 has shifted to icon 810. Each of the dimensions associated with the data source of the Accounts Receivable—Line Item report is displayed clearly, while the associated fields are hidden. The dimensions and fields of the data source associated with the Sales Order Volume report are displayed similarly. Embodiments may graphically portray the association of the two data sources, and the fields and Key Figures of the data sources, in any manner that is or becomes known.

Figure 12:
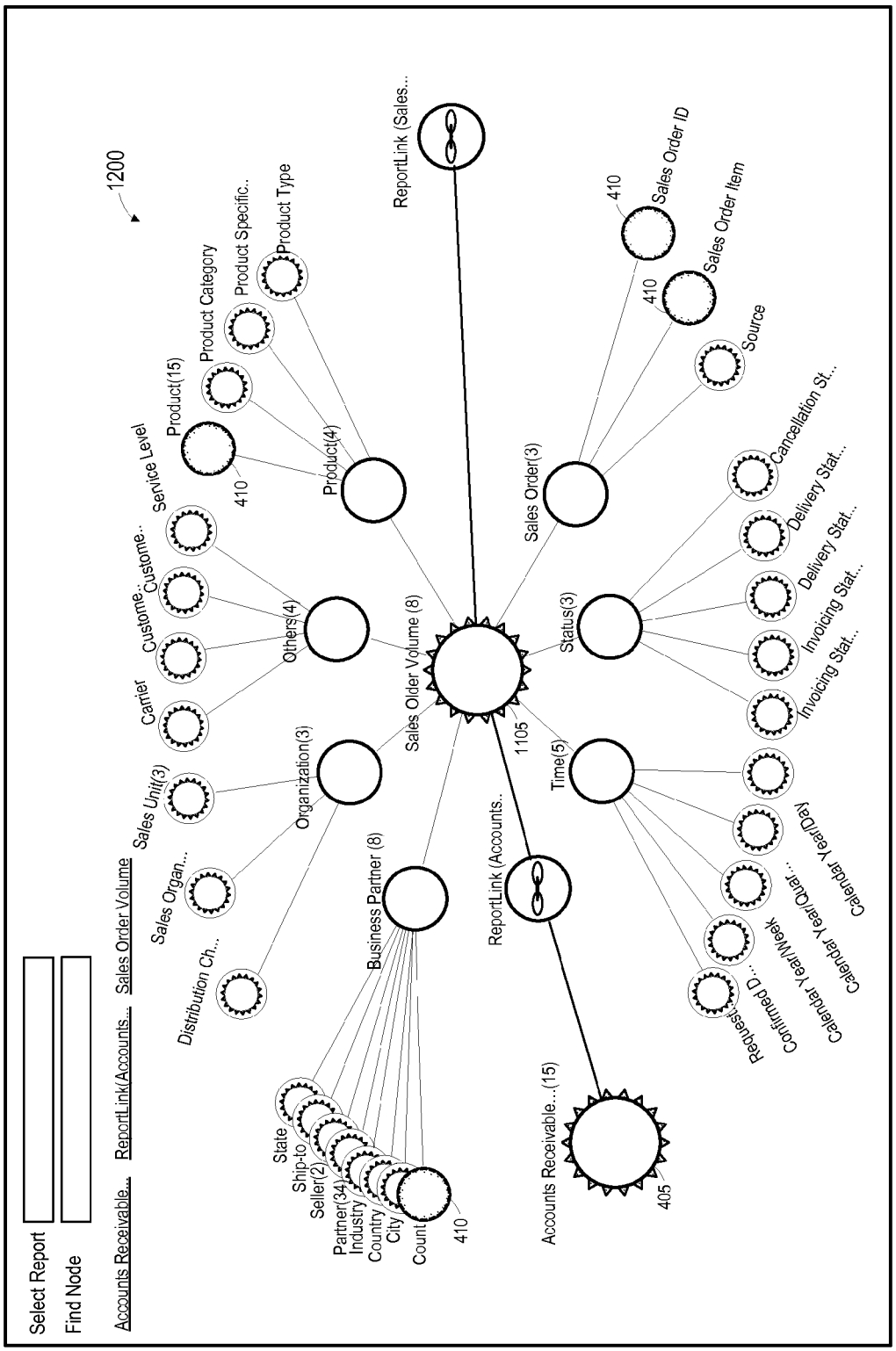
FIG. 12 is a view of a graphical representation of a data source according to some embodiments.

Any of the icons associated with a dimension may be selected to view its fields and to select the fields for inclusion into or removal from the "combined" report. Diagram 1200 of FIG. 12 reflects user manipulation of diagram 1100 according to some embodiments. More particularly, the user has selected icon 1105 of FIG. 11, thereby changing the focus of diagram 1100, and has selected the icons representing each dimension associated with icon 1105 in order to view the fields thereof.

Icons 410 of diagram 1200 represent user-selected fields to be included in the combined report. It should be noted that icon 405 is also associated with unshown fields which are also to be included in the combined report. Those fields are hidden in diagram 1200 for clarity, but embodiments are not limited thereto. The user may also select additional Key Figures from the second data source through icon 1105 as described above with respect to FIG. 5.

Figure 13:
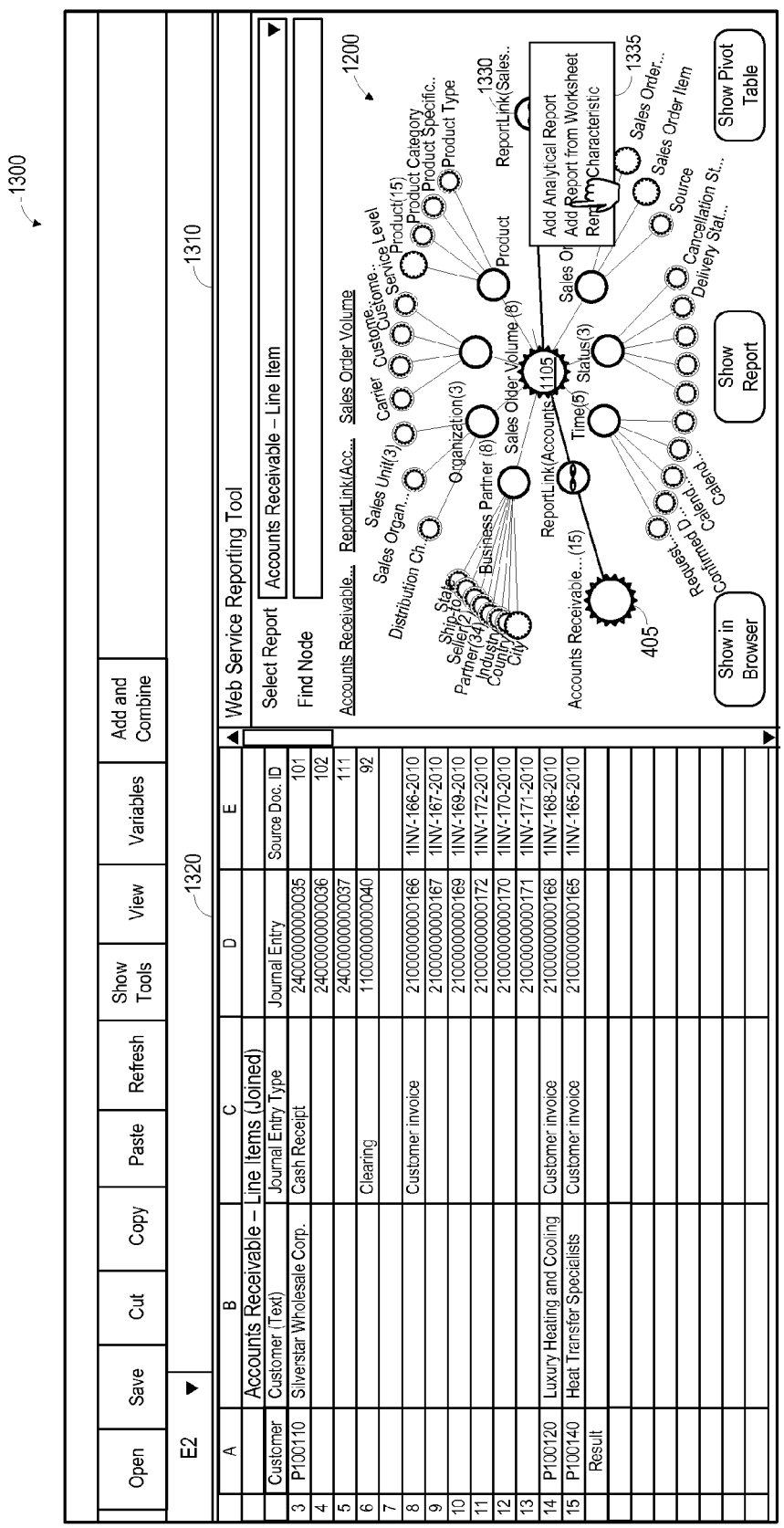
FIG. 13 is an outward view of a spreadsheet application user interface according to some embodiments.

User interface 1300 of FIG. 13 presents a smaller, simplified version of diagram 1200 within pane 1310. Moreover, pane 1320 displays a combined report reflecting the selections of Key Figures and fields which are represented in diagram 1200. The combined report is generated based on the field mapping described above and using an outer join. For 1:n relationships, the detail data is copied and the corresponding sub-totals are adjusted.

As described above, the Key Figures and fields of the report are selected from two different data sources. The displayed report is a standard spreadsheet-based report which can be used in any known manner. In this regard, the view and variables of the report may be modified via controls such as pane 230 of FIG. 2.

Pane 1310 also illustrates selection of Report Link icon 1330 so as to display menu 1335. Menu 1335 allows a user to add a report from a standard worksheet to diagram 1200 and, as a result, to the report presented in pane 1320.

Figure 14:
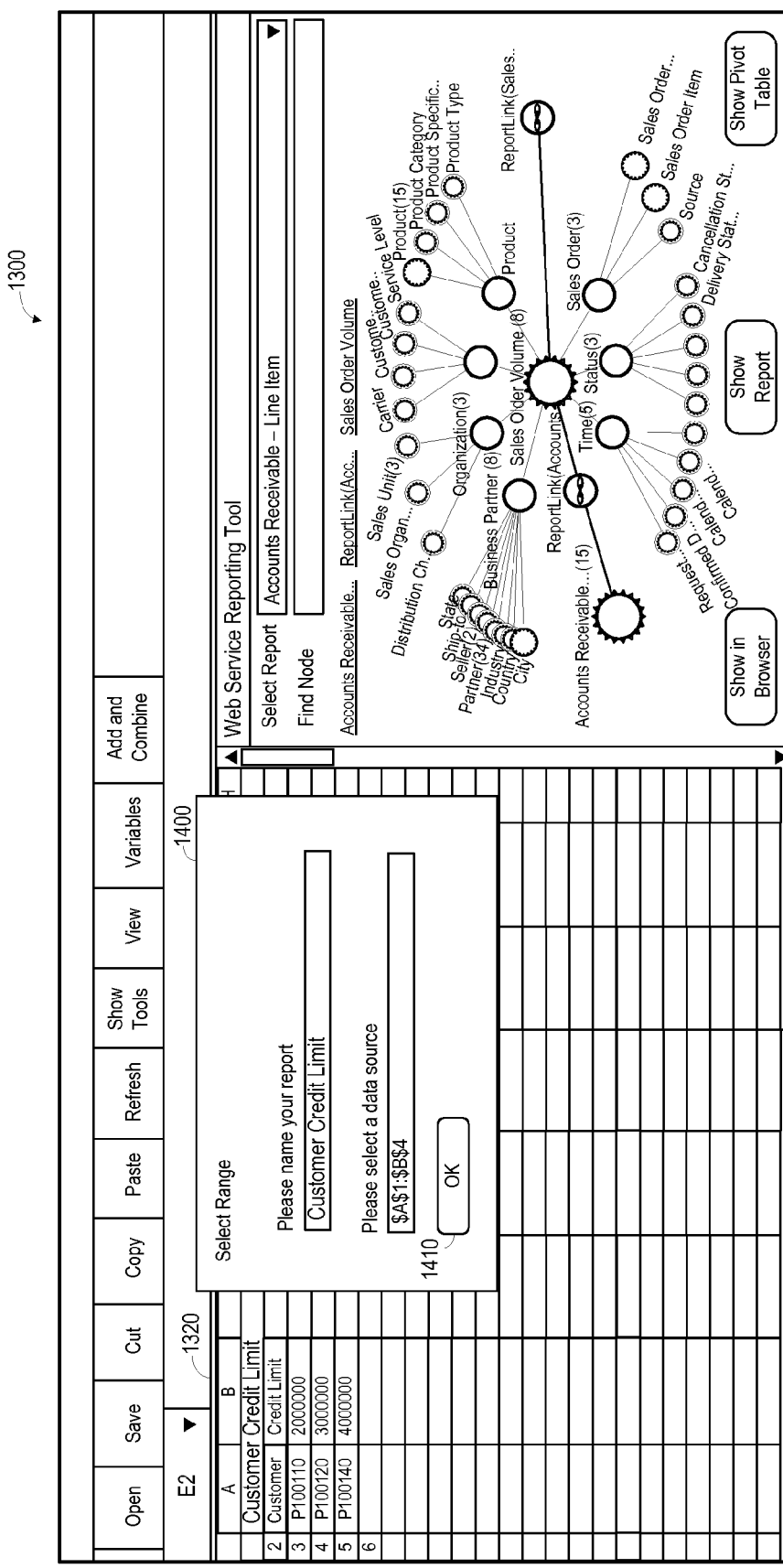
FIG. 14 is an outward view of a spreadsheet application user interface according to some embodiments.
Figure 15:
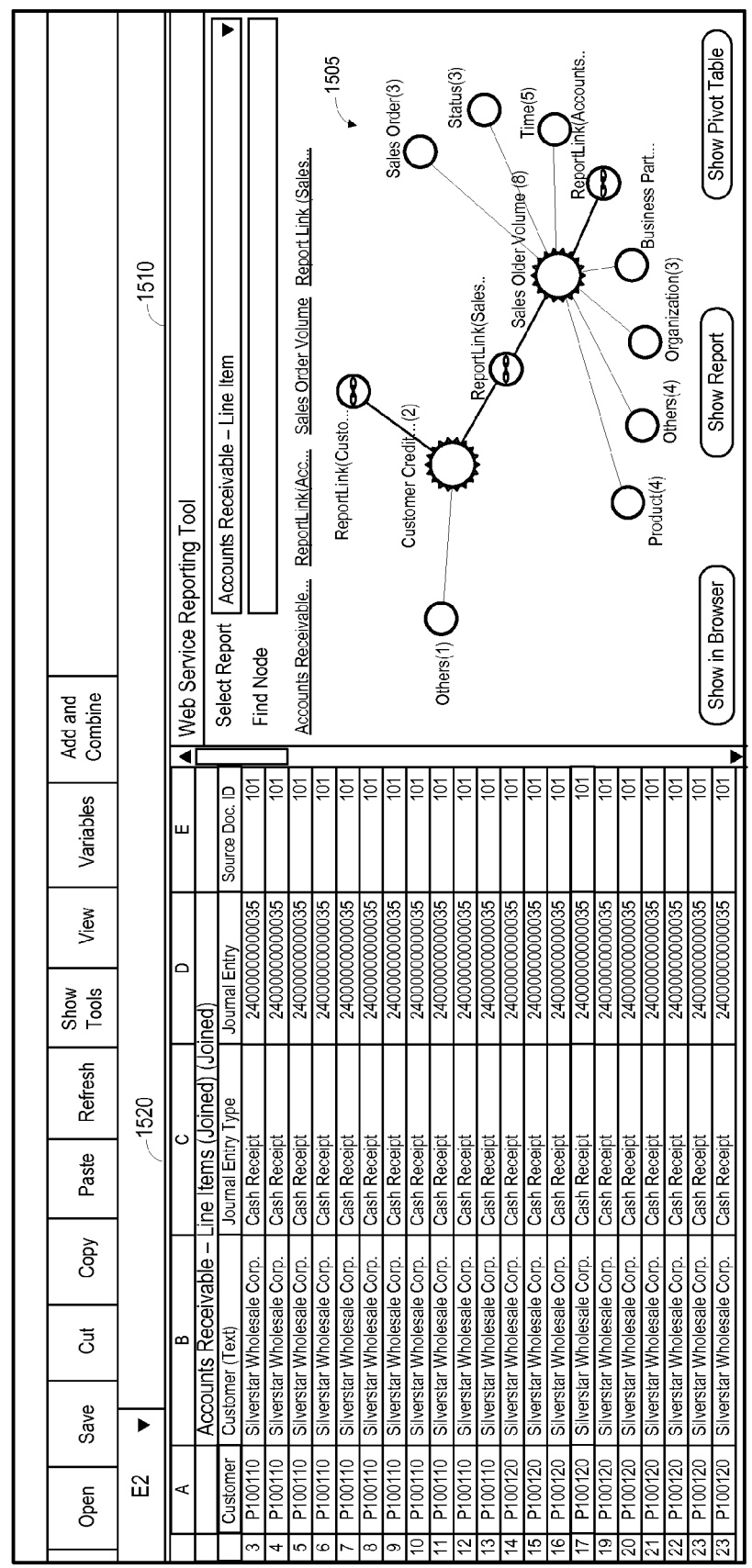
FIG. 15 is an outward view of a spreadsheet application user interface according to some embodiments.

Window 1400 of FIG. 14 may be presented upon selection of Add Report from Worksheet from menu 1335. A new Sheet has been selected in pane 1320 and various cells of the displayed report are selected as a data source in window 1400. Next, the user selects OK icon 1410.

User interface 1500 presents the results of the above operation. Pane 1510 shows diagram 1515, which represents a report created from three different data sources. More specifically, the data sources include the data source of the Accounts Receivable—Line Items report, the data source of the Sales Order Volume report, and the worksheet data source defined in window 1400.

Pane 1520 displays a combined report reflecting the selections of Key Figures and fields which are represented in diagram 1515. Again, the combined report may be generated using an outer join. Diagram 1515 may be further manipulated as described above to select (or remove) fields and Key Figures of the current data source, and/or to add fields and/or Key Figures from yet another data source.

Figure 16:
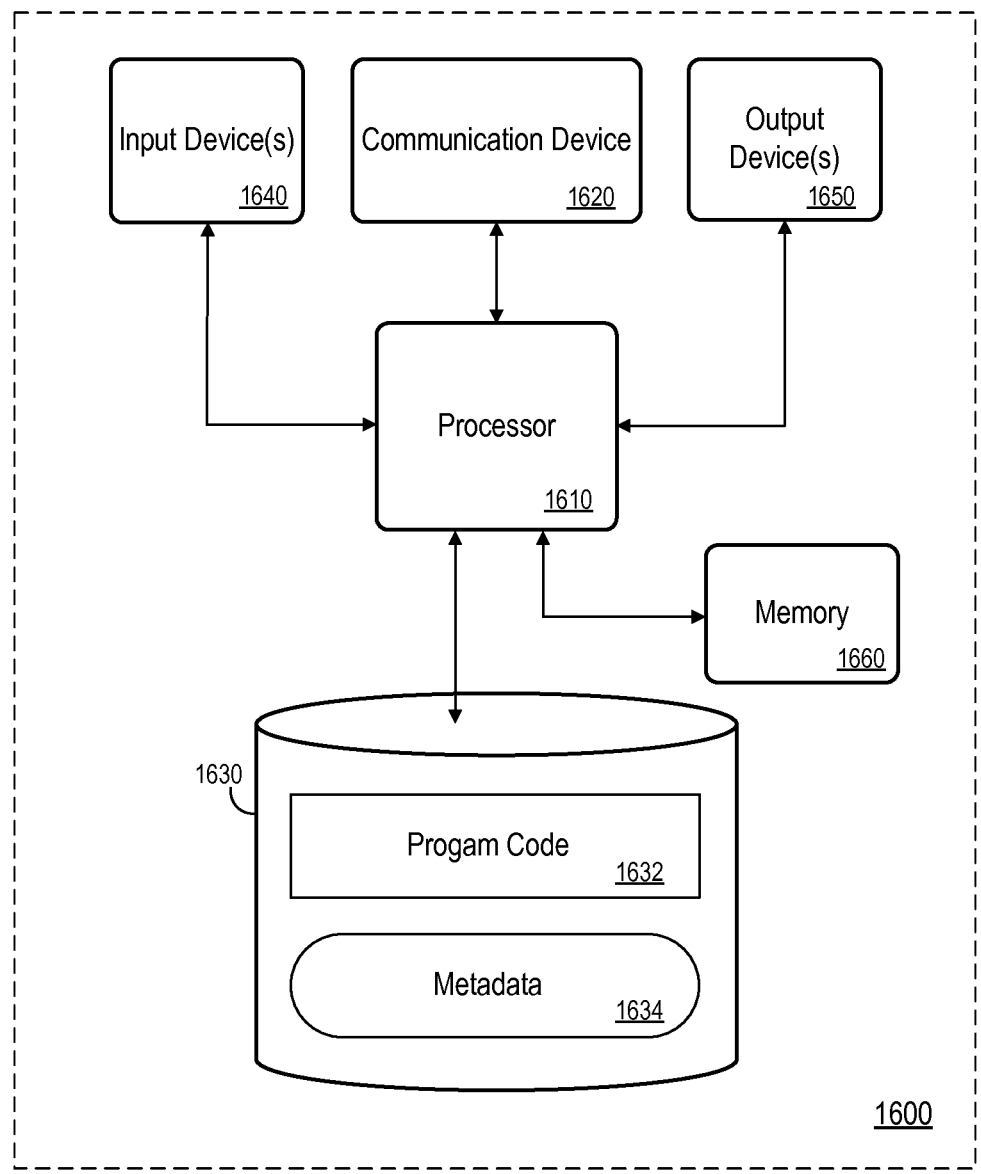
FIG. 16 is a block diagram of a computing device according to some embodiments.

FIG. 16 is a block diagram of apparatus 1600 according to some embodiments. Apparatus 1600 may comprise a general-purpose computing apparatus and may execute program code to perform any of the functions described herein. Apparatus 1600 may comprise an implementation of one or more elements of system 100, and/or of a client device on which the user interfaces and diagrams of the present description are presented. Apparatus 1600 may include other unshown elements according to some embodiments.

Apparatus 1600 includes processor 1610 operatively coupled to communication device 1620, data storage device 1630, one or more input devices 1640, one or more output devices 1650 and memory 1660. Communication device 1620 may facilitate communication with external devices, such as an external design tool. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to enter information into apparatus 1600. Output device(s) 1650 may comprise, for example, a display (e.g., a display screen) a speaker, and/or a printer.

Data storage device 1630 may comprise any appropriate persistent storage device, including combinations of magnetic storage devices (e.g., magnetic tape, hard disk drives and flash memory), optical storage devices, Read Only Memory (ROM) devices, etc., while memory 1660 may comprise Random Access Memory (RAM).

Program code 1632 of data storage device 1630 may be executable by processor 1610 to provide any of the functions described herein. Embodiments are not limited to execution of these functions by a single apparatus. Metadata 1634 may include metadata of reports and data sources as described herein. Data storage device 1630 may also store data and other program code for providing additional functionality and/or which are necessary for operation thereof, such as device drivers, operating system files, etc.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, comprising:

receiving a selection of a first graphical report, the first graphical report depicting data of a first data structure defined by first metadata, the first metadata defining a first plurality of fields and defining a first key figure, and the first graphical report including the first key figure and a plurality of the first plurality of fields, wherein the first graphical report is one of a spreadsheet or a graphical chart;

presenting a first graphical representation of the first data structure, the first graphical representation comprising a first graphical icon representing the first key figure, and a plurality of second graphical icons, each of the plurality of second graphical icons representing a respective one of the plurality of the first plurality of fields of the first graphical report, and each of the plurality of second graphical icons graphically linked to the first graphical icon;

receiving a selection of one of the second graphical icons representing a field of the first graphical report;

receiving a selection of a second graphical report, the second graphical report depicting data of a second data structure defined by second metadata, the second metadata defining a second plurality of fields and defining a second key figure, the second graphical report including the second key figure and a plurality of the second plurality of fields, wherein the second graphical report is one of a spreadsheet or a graphical chart;

receiving an indication of a mapping between the field of the first graphical report and one of the second plurality of fields;

presenting a second graphical representation of the second data structure, the second graphical representation comprising a third graphical icon representing the second key figure and a plurality of fourth graphical icons, each of the plurality of fourth graphical icons representing a respective one of the second plurality of fields, each of the plurality of fourth graphical icons graphically linked to the third graphical icon, and the third graphical icon graphically linked to the first graphical icon;

receiving a selection of one of the plurality of fourth graphical icons representing one of the second plurality of fields; and generating, based on the mapping, a third graphical report comprising the first key figure, the second key figure, the plurality of the first plurality of fields and the one of the second plurality of fields, wherein the third graphical report is one of a spreadsheet or a graphical chart.

2. A method according to claim 1, wherein generating the third graphical report comprises mapping a field of the first data structure to a field of the second data structure.

3. A method according to claim 1, further comprising:

in response to receiving the selection of the one of the plurality of fourth graphical icons, changing the one of the plurality of fourth graphical icons to a fifth graphical icon.

4. A method according to claim 3, wherein the fifth graphical icon is substantially identical to the second graphical icons.

5. A method according to claim 1, further comprising:

receiving a selection of a fourth graphical report, the fourth graphical report depicting data of a third data structure defined by third metadata, the third metadata defining a third plurality of fields and defining a third key figure, the fourth graphical report including the third key figure and a plurality of the third plurality of fields, wherein the fourth graphical report is one of a spreadsheet or a graphical chart;

receiving an indication of a mapping between the field of the first report and one of the third plurality of fields;

presenting a third graphical representation of the third data structure, the third graphical representation comprising a fifth graphical icon representing the third key figure and a plurality of sixth graphical icons, each of the plurality of sixth graphical icons representing a respective one of the third plurality of fields, each of the plurality of sixth graphical icons graphically linked to the fifth graphical icon, and the fifth graphical icon graphically linked to the first graphical icon; and receiving a selection of one of the plurality of sixth graphical icons representing one of the third plurality of fields, wherein generating the third graphical report comprises generating the third graphical report to include the plurality of the first plurality of fields, the one of the second plurality of fields, and the one of the third plurality of fields.

6. A method according to claim 1, wherein the first metadata defines a plurality of dimensions, each of the dimensions associated with a respective one of the first plurality of fields, and wherein the first graphical representation comprises a plurality of fifth graphical icons, each of the fifth graphical icons representing a respective one of the plurality of dimensions, wherein the first graphical icon is graphically connected to each of the fifth graphical icons, and wherein each of the fifth graphical icons is graphically connected to each respective one of the first plurality of fields with which the fifth graphical icon is associated.

7. A method according to claim 1, further comprising:

receiving a selection of the second key figure; and wherein generating the third graphical report comprises generating the third graphical report to include the plurality of the first plurality of fields, the one of the second plurality of fields, and the second key figure.

8. A non-transitory medium storing processor-executable program code, the program code executable by a device to:

receive a selection of a first graphical report, the first graphical report depicting data of a first data structure defined by first metadata, the first metadata defining a first plurality of fields and defining a first key figure, and the first graphical report including the first key figure and a plurality of the first plurality of fields, wherein the first graphical report is one of a spreadsheet or a graphical chart;

present a first graphical representation of the first data structure, the first graphical representation comprising a first graphical icon representing the first key figure, and a plurality of second graphical icons, each of the plurality of second graphical icons representing a respective one of the plurality of the first plurality of fields of the first graphical report, and each of the plurality of second graphical icons graphically linked to the first graphical icon;

receive a selection of one of the second graphical icons representing a field of the first report;

receive a selection of a second graphical report, the second report depicting data of a second data structure defined by second metadata, the second metadata defining a second plurality of fields and defining a second at least one key figure, the second graphical report including the second key figure and a plurality of the second plurality of fields, wherein the second graphical report is one of a spreadsheet or a graphical chart;

receive an indication of a mapping between the field of the first graphical report and one of the second plurality of fields;

present a second graphical representation of the second data structure, the second graphical representation comprising a third graphical icon representing the second key figure and a plurality of fourth graphical icons, each of the plurality of fourth graphical icons representing a respective one of the second plurality of fields, each of the plurality of fourth graphical icons graphically linked to the third graphical icon, and the third graphical icon graphically linked to the first graphical icon;

receive a selection of one of the plurality of fourth graphical icons representing one of the second plurality of fields; and generate, based on the mapping, a third graphical report comprising the first key figure, the second key figure, the plurality of the first plurality of fields and the one of the second plurality of fields, wherein the third graphical report is one of a spreadsheet or a graphical chart.

9. A medium according to claim 8, wherein generation of the third graphical report comprises mapping of a field of the first data structure to a field of the second data structure.

10. A medium according to claim 8, the program code further executable by a device to:

change, in response to receiving the selection of the one of the plurality of fourth graphical icons, the one of the plurality of fourth graphical icons to a fifth graphical icon.

11. A medium according to claim 10, wherein the fifth graphical icon is substantially identical to the second graphical icons.

12. A medium according to claim 8, the program code further executable by a device to:

receive a selection of a fourth graphical report, the fourth graphical report depicting data of a third data structure defined by third metadata, the third metadata defining a third plurality of fields and defining a third one key figure, the fourth graphical report including the third key figure and a plurality of the third plurality of fields, wherein the fourth graphical report is one of a spreadsheet or a graphical chart;

receive an indication of a mapping between the field of the first report and one of the third plurality of fields;

present a third graphical representation of the third data structure, the third graphical representation comprising a fifth graphical icon representing the third key figure and a plurality of sixth graphical icons, each of the plurality of sixth graphical icons representing a respective one of the third plurality of fields, each of the plurality of sixth graphical icons graphically linked to the fifth graphical icon, and the fifth graphical icon graphically linked to the first graphical icon; and receive a selection of one of the plurality of sixth graphical icons representing one of the third plurality of fields, wherein generation of the third graphical report comprises generating the third graphical report to include the plurality of the first plurality of fields, the one of the second plurality of fields, and the one of the third plurality of fields.

13. A medium according to claim 8, wherein the first metadata defines a plurality of dimensions, each of the dimensions associated with a respective at least one of the first plurality of fields, and wherein the first graphical representation comprises a plurality of fifth graphical icons, each of the fifth graphical icons representing a respective one of the plurality of dimensions, wherein the first graphical icon is graphically connected to each of the fifth graphical icons, and wherein each of the fifth graphical icons is graphically connected to each respective one of the first plurality of fields with which the fifth graphical icon is associated.

14. A medium according to claim 8, the program code further executable by a device to:

receive a selection of the second key figure; and wherein generation of the third report comprises generation of the third report to include the plurality of the first plurality of fields, the one of the second plurality of fields, and the second key figure.

15. A system comprising:

a computing device comprising:

a memory system storing processor-executable program code; and a processor to execute the processor-executable program code in order to cause the computing device to:

receive a selection of a first graphical report, the first graphical report depicting data of a first data structure defined by first metadata, the first metadata defining a first plurality of fields and defining a first key figure, and the first graphical report including the first key figure and a plurality of the first plurality of fields, wherein the first graphical report is one of a spreadsheet or a graphical chart;

present a first graphical representation of the first data structure, the first graphical representation comprising a first graphical icon representing the first key figure, and a plurality of second graphical icons, each of the plurality of second graphical icons representing a respective one of the plurality of the first plurality of fields of the first graphical report, and each of the plurality of second graphical icons graphically linked to the first graphical icon;

receive a selection of one of the second graphical icons representing a field of the first graphical report;

receive a selection of a second graphical report, the second graphical report depicting data of a second data structure defined by second metadata, the second metadata defining a second key figure, the second graphical report including the second key figure and a plurality of the second plurality of fields, wherein the second graphical report is one of a spreadsheet or a graphical chart;

receive an indication of a mapping between the field of the first report and one of the second plurality of fields;

present a second graphical representation of the second data structure, the second graphical representation comprising a third graphical icon representing the second key figure and a plurality of fourth graphical icons, each of the plurality of fourth graphical icons representing a respective one of the second plurality of fields, each of the plurality of fourth graphical icons graphically linked to the third graphical icon, and the third graphical icon graphically linked to the first graphical icon;

receive a selection of one of the plurality of fourth graphical icons representing one of the second plurality of fields; and generate, based on the mapping, a third graphical report comprising the first key figure, the second key figure, the plurality of the first plurality of fields and the one of the second plurality of fields, wherein the third graphical report is one of a spreadsheet or a graphical chart.

16. A system according to claim 15, wherein generation of the third graphical report comprises mapping of a field of the first data structure to a field of the second data structure.

17. A system according to claim 15, the processor further to execute the processor-executable program code in order to cause the computing device to:

change, in response to receiving the selection of the one of the plurality of fourth graphical icons, the one of the plurality of fourth graphical icons to a fifth graphical icon.

18. A system according to claim 17, wherein the fifth graphical icon is substantially identical to the second graphical icons.

19. A system according to claim 15, the processor further to execute the processor-executable program code in order to cause the computing device to:

receive a selection of a fourth graphical report, the fourth graphical report based on a third data source defined by third metadata, the third metadata defining a third plurality of fields and defining a third key figure, the fourth graphical report including the third key figure and a plurality of the third plurality of fields, wherein the fourth graphical report is one of a spreadsheet or a graphical chart;

receive an indication of a mapping between the field of the first report and one of the third plurality of fields;

present a third graphical representation of the third data structure, the third graphical representation comprising a fifth graphical icon representing the third key figure and a plurality of sixth graphical icons, each of the plurality of sixth graphical icons representing a respective one of the third plurality of fields, each of the plurality of sixth graphical icons graphically linked to the fifth graphical icon, and the fifth graphical icon graphically linked to the first graphical icon; and receive a selection of one of the plurality of sixth graphical icons representing one of the third plurality of fields, wherein generation of the third graphical report comprises generating the third graphical report to include the plurality of the first plurality of fields, the one of the second plurality of fields, and the one of the third plurality of fields.

20. A system according to claim 15, wherein the first metadata defines a plurality of dimensions, each of the dimensions associated with a respective one of the first plurality of fields, and wherein the first graphical representation comprises a plurality of fifth graphical icons, each of the fifth graphical icons representing a respective one of the plurality of dimensions, wherein the first graphical icon is graphically connected to each of the fifth graphical icons, and wherein each of the fifth graphical icons is graphically connected to each respective one of the first plurality of fields with which the fifth graphical icon is associated.

21. A system according to claim 15, the processor further to execute the processor-executable program code in order to cause the computing device to:

receive a selection of the second key figure; and wherein generation of the third graphical report comprises generation of the third graphical report to include the plurality of the first plurality of fields, the one of the second plurality of fields, and the second key figure.

* * * * *